United States Patent
Aoki

(10) Patent No.: US 9,894,703 B2
(45) Date of Patent: Feb. 13, 2018

(54) COMMUNICATIONS APPARATUS, CONTROL METHOD, AND STORAGE MEDIUM

(71) Applicant: CANON KABUSHIKI KAISHA, Tokyo (JP)

(72) Inventor: Hitoshi Aoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 116 days.

(21) Appl. No.: 15/068,862

(22) Filed: Mar. 14, 2016

(65) Prior Publication Data
US 2016/0278082 A1   Sep. 22, 2016

(30) Foreign Application Priority Data
Mar. 18, 2015   (JP) .................................. 2015-055352

(51) Int. Cl.
H04J 3/00   (2006.01)
H04W 76/04   (2009.01)
(Continued)

(52) U.S. Cl.
CPC ......... *H04W 76/046* (2013.01); *H04W 74/00* (2013.01); *H04L 67/325* (2013.01);
(Continued)

(58) Field of Classification Search
None
See application file for complete search history.

(56) References Cited

U.S. PATENT DOCUMENTS 8,964,631 B2   2/2015   Aoki
2008/0205340 A1   8/2008   Meylan et al.
(Continued)

FOREIGN PATENT DOCUMENTS

EP   2981146 A1   2/2016
JP   2002-305717 A   10/2002
(Continued)

OTHER PUBLICATIONS

Lai et al., "Efficient and scalable IEEE 802.11 Ad-Hoc-Mode Timing Synchronization Function", Proceedings of the 17th International Conference on Advanced Information Networking and Applications (AINA '03), pp. 1-6, 2003.
(Continued)

*Primary Examiner* — Phirin Sam
(74) *Attorney, Agent, or Firm* — Carter, DeLuca, Farrell & Schmidt, LLP

(57) ABSTRACT

A communications apparatus is provided that determines a timing of starting a period when a communications group, to which other communications apparatuses belong, can perform communications, based on a beacon signal that was received in a predetermined period; transmits a signal that requests obtaining of information to the other communications apparatuses, according to the determined timing; and obtains information from each of the other communications apparatuses. The communications apparatus transmits the signal according to the timing determined based on a beacon from an apparatus belonging to a first communications group to other communications apparatuses that belong to the first communications group, and the signal according to the timing determined based on a beacon from an apparatus belonging to a second communications group to other communications apparatuses that belong to the second communications group.

16 Claims, 13 Drawing Sheets

(51) Int. Cl.
*H04W 74/00* (2009.01)
*H04L 29/08* (2006.01)
*H04W 72/02* (2009.01)
*H04W 4/00* (2009.01)
*H04W 4/02* (2009.01)
*H04L 29/06* (2006.01)

(52) U.S. Cl.
CPC ............ *H04L 69/28* (2013.01); *H04W 4/008* (2013.01); *H04W 4/02* (2013.01); *H04W 72/02* (2013.01)

(56) References Cited

U.S. PATENT DOCUMENTS

| | | | | |
|---|---|---|---|---|
| 2008/0253354 | A1* | 10/2008 | Eguchi | ................. H04W 56/00 370/350 |
| 2009/0303978 | A1* | 12/2009 | Pajukoski | ............ H04L 5/0053 370/345 |
| 2010/0172290 | A1* | 7/2010 | Nam | ..................... H04L 1/1854 370/328 |
| 2013/0078912 | A1 | 3/2013 | San Vicente et al. | |
| 2013/0265332 | A1 | 10/2013 | Miyakawa | |
| 2015/0148065 | A1* | 5/2015 | Nakao | ................... H04W 48/16 455/456.1 |
| 2015/0245317 | A1 | 8/2015 | Aoki | |
| 2015/0245399 | A1 | 8/2015 | Aoki | |
| 2015/0245400 | A1 | 8/2015 | Aoki | |

FOREIGN PATENT DOCUMENTS

| | | |
|---|---|---|
| JP | 2005-051522 A | 2/2005 |
| JP | 2009-512282 T | 3/2009 |
| JP | 2010-062866 A | 3/2010 |
| JP | 2010-148000 A | 7/2010 |
| JP | 2013-242865 A | 12/2013 |
| WO | 2007/044597 A2 | 4/2007 |
| WO | 2014/157783 A1 | 10/2014 |

OTHER PUBLICATIONS

Extended European search report issued in corresponding application No. 16000495.8 dated Jul. 27, 2016.

* cited by examiner

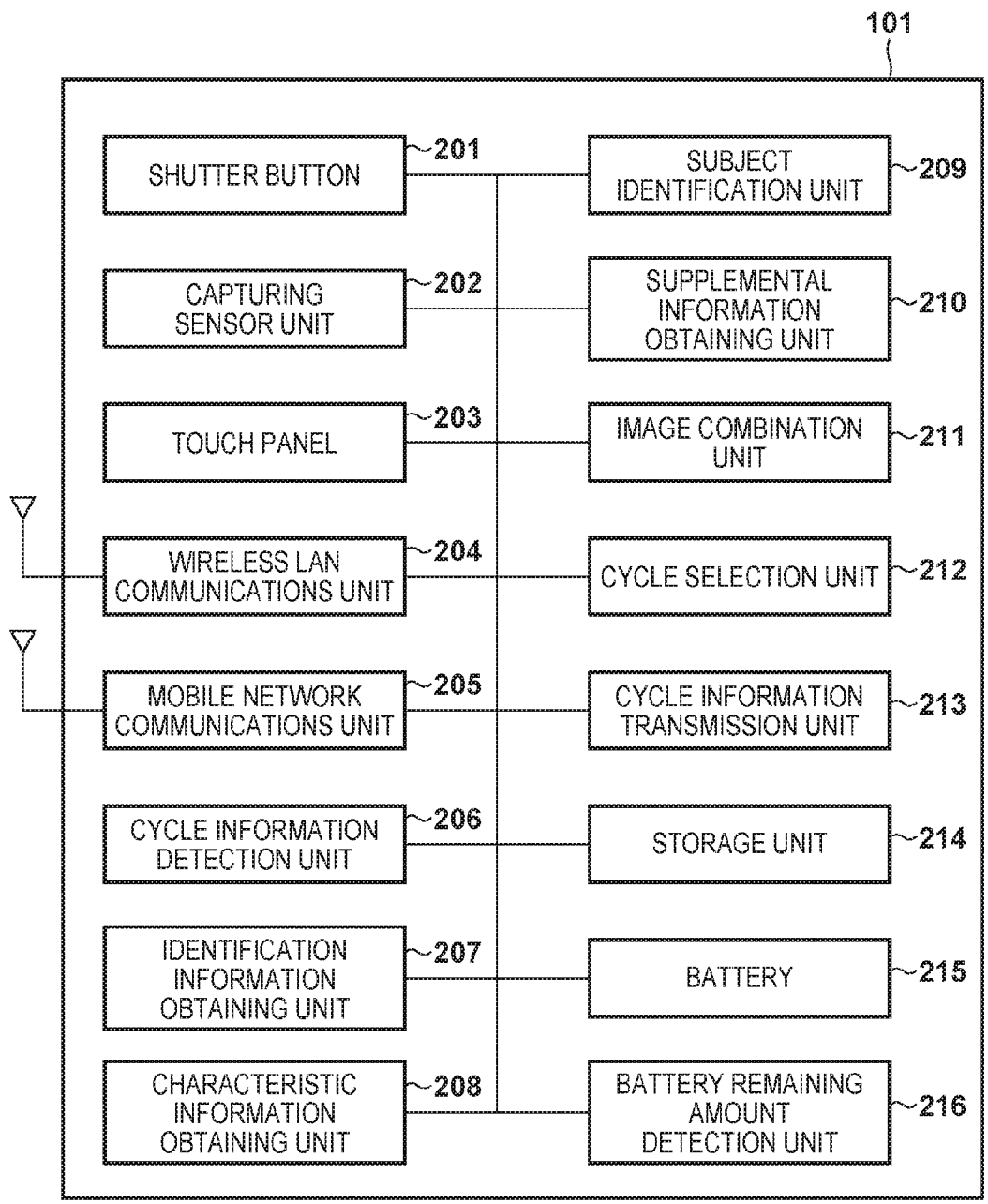

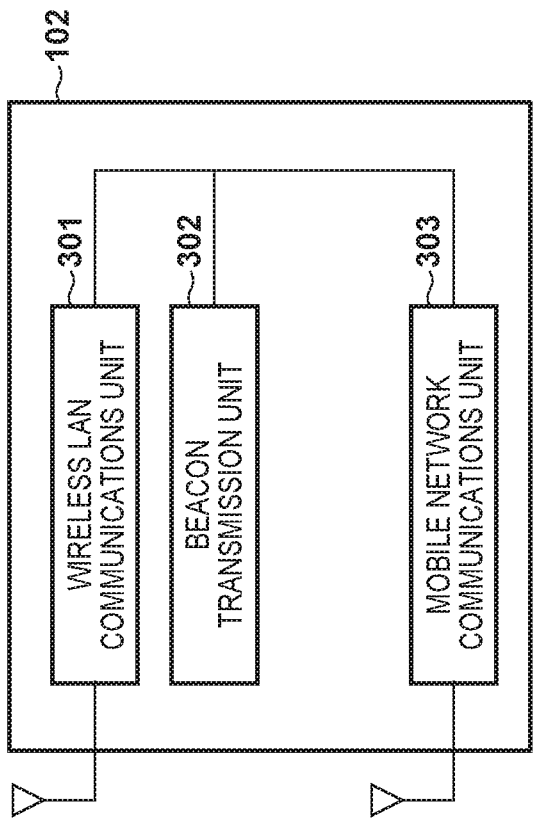

| | IDENTIFICATION INFORMATION | SUPPLEMENTAL INFORMATION | FACE CHARACTERISTIC INFORMATION |
|---|---|---|---|
| MOBILE PHONE 102a | 00:00:85:00:00:01 | I'M LOOKING FOR A DELICIOUS RAMEN SHOP | CHARACTERISTIC INFORMATION OF 102a |
| MOBILE PHONE 102b | 00:00:85:00:00:02 | I SUGGEST RAMEN SHOP XX! | CHARACTERISTIC INFORMATION OF 102b |
| MOBILE PHONE 102c | 00:00:85:00:00:03 | I WANT TO EAT RAMEN | CHARACTERISTIC INFORMATION OF 102c |
| MOBILE PHONE 102d | 00:00:85:00:00:04 | I'M HUNGRY | CHARACTERISTIC INFORMATION OF 102d |

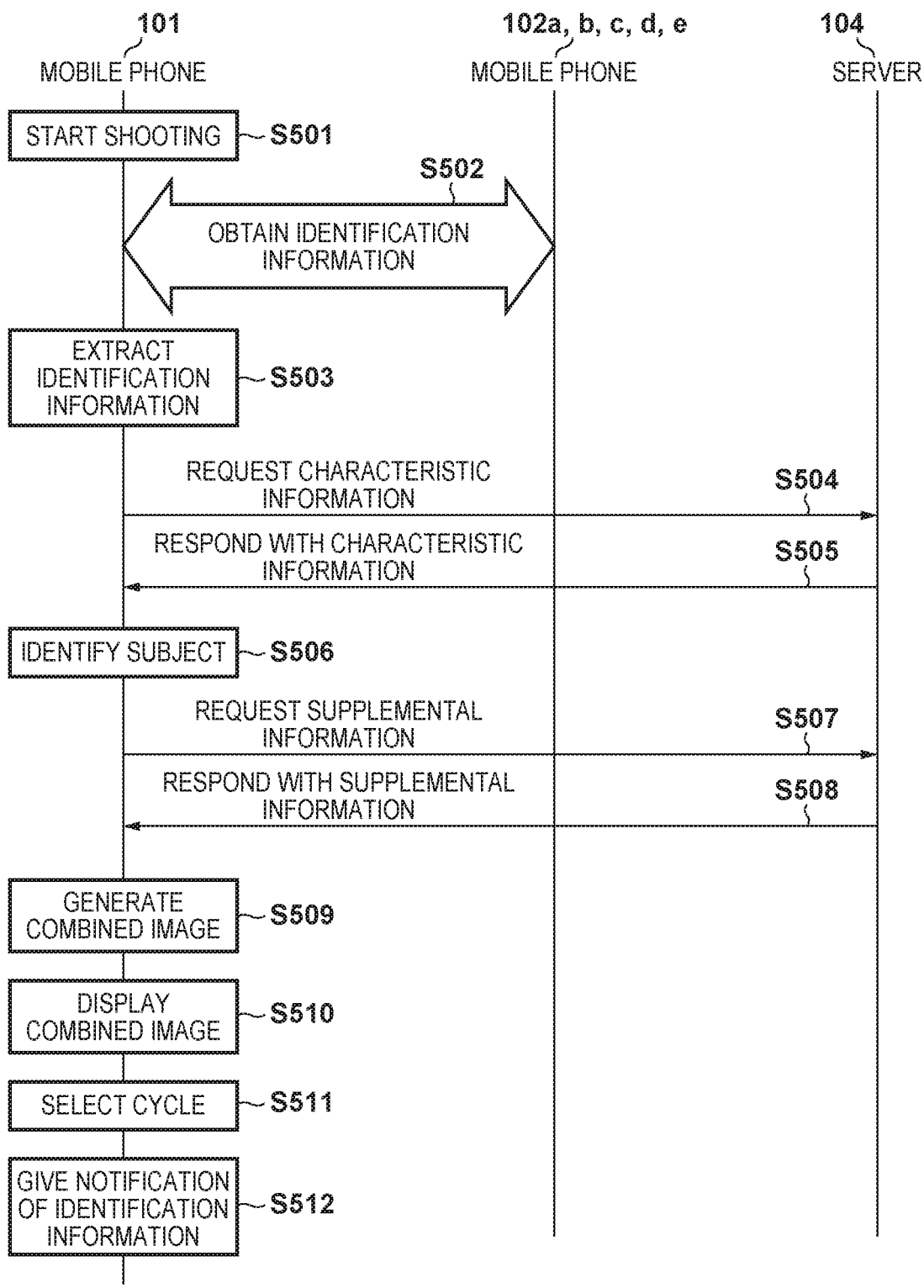

FIG. 8

| Element ID (= 255 : Vendor Specific) | Length (= 11) | OUI (= 00-00-85) | Device ID (=IDENTIFICATION INFORMATION) | Listen Period (= AWAKE PERIOD) |
|---|---|---|---|---|
| 1 | 1 | 3 | 6 | 2 |

Octets:

FIG. 9

| Category Code (= 4 : Public) | Action (= Device Detect) | Device ID (= MAC Address) | Type (= 1 : ID Request) |
|---|---|---|---|
| 1 | 1 | 6 | 1 |

Octets:

F I G. 14

| Category Code (= 4 : Public) | Action (= Device Detect) | Device ID (= MAC Address) | Type (= 3 : ID Message) | Data (Message contents) |
|---|---|---|---|---|
| 1 | 1 | 6 | 1 | |

Octets:

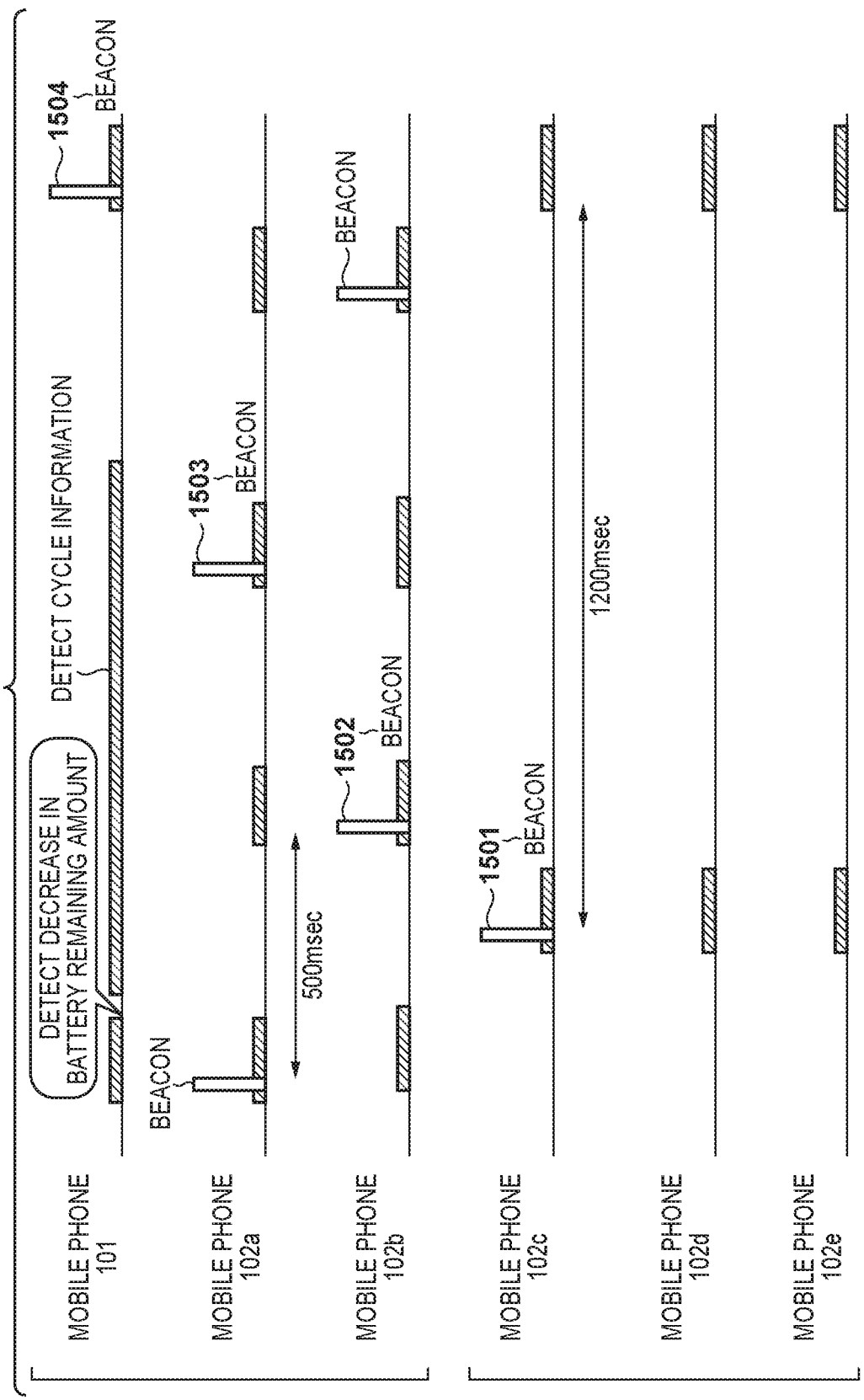

COMMUNICATIONS APPARATUS, CONTROL METHOD, AND STORAGE MEDIUM

BACKGROUND OF THE INVENTION

Field of the Invention

The present invention relates to communications control technology.

Description of the Related Art

Augmented reality (AR) technology has been realized in which, in an image of a real environment captured with a digital camera, a mobile phone, or the like, attribute information related to a photographic subject such as a person or an object is displayed combined with the subject. For example, in Japanese Patent Laid-Open No. 2013-242865, technology is described in which, for a captured image, the correspondence of a real space and a virtual space is determined from position information from a GPS (Global Positioning System) or the like, and the virtual space and the captured image are displayed in a superimposed manner.

Also, in Japanese Patent Laid-Open No. 2002-305717, technology is described in which characteristic information related to a photographic subject, such as the face of a person or the outline of an object, is used to identify that subject, and information related to the subject is displayed combined with the subject in the vicinity of the subject in a captured image. Note that Japanese Patent Laid-Open No. 2002-305717 also describes that the camera communicates with a communications apparatus possessed by the subject, and after identifying the subject by that communication, information related to the subject is combined with the subject.

With the technique described in Japanese Patent Laid-Open No. 2002-305717, when communicating with the communications apparatus possessed by the subject, wireless communications by a wireless LAN, Bluetooth (registered trademark), RFID, or the like can be used. Here, in order to communicate by wireless communications with the communications apparatus possessed by the person that is the subject, it is necessary for the communications apparatus to transmit or receive wireless signals. On the other hand, for example in a communications apparatus in which a wireless LAN is adopted, there are cases where, in order to suppress power consumption, switching between a mode in which signals can be transmitted or received, and a mode in which signals cannot be transmitted or received, is performed in a certain cycle. In a case of communicating with this sort of communications apparatus, if information is not requested at least in a period in which a counterpart apparatus can receive a signal, information cannot be obtained from that counterpart apparatus. Therefore, it is important that when communicating with a counterpart apparatus, the communications apparatus is synchronized with a period in which that counterpart apparatus can receive a signal (see Japanese Patent Laid-Open No. 2009-512282).

In a case where several other communications apparatuses are present in the surroundings, it is conceivable to switch between a period in which data can be received and a period in which data cannot be received, in independent cycles for each communications apparatus. In such a case, there is the problem that frequency utilization efficiency can be degraded when the communications apparatus is synchronized individually with each of those other communications apparatuses, and transmits an individual information request for each of those other communications apparatuses.

The present invention provides a technique for improving frequency utilization efficiency when communicating with a plurality of other communications apparatuses that each become capable of data communications in independent cycles.

SUMMARY OF THE INVENTION

According to one aspect of the present invention, there is provided a communications apparatus, comprising: a determination unit configured to determine a timing of starting a period when a communications group, to which a plurality of other communications apparatuses belong, can perform communications, based on a beacon signal that was received by the communications apparatus in a predetermined period; a transmission unit configured to transmit a signal that requests obtaining of information to the plurality of other communications apparatuses, according to the timing that was determined by the determination unit; and an obtaining unit configured to obtain information from each of the plurality of other communications apparatuses in a case where the signal was transmitted by the transmission unit, wherein in a case where a first communications group and a second communications group having different timings of starting a period when communications are possible were detected based on a plurality of beacon signals that were received by the communications apparatus in the predetermined period, the transmission unit, to a plurality of other communications apparatuses that belong to the first communications group, transmits the signal according to the timing that was determined by the determination unit based on a beacon from an apparatus that belongs to the first communications group from among the plurality of beacon signals, and to a plurality of other communications apparatuses that belong to the second communications group, transmits the signal according to the timing that was determined by the determination unit based on a beacon from an apparatus that belongs to the second communications group from among the plurality of beacon signals.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a block diagram that shows an example functional configuration of a mobile phone.

FIG. 3 is a block diagram that shows an example functional configuration of another mobile phone.

FIG. 4 shows an example of data stored in a server.

FIG. 5 is a sequence diagram that shows an example flow of processing executed in the system.

FIG. 8 shows a summary of Information Elements of cycle information.

FIG. 9 shows a summary of an ID Request frame.

FIG. 14 shows a summary of a Message frame.

FIG. 15 is a sequence diagram that shows an example flow of processing executed when a battery decrease was detected.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

System Configuration

Figure 1:
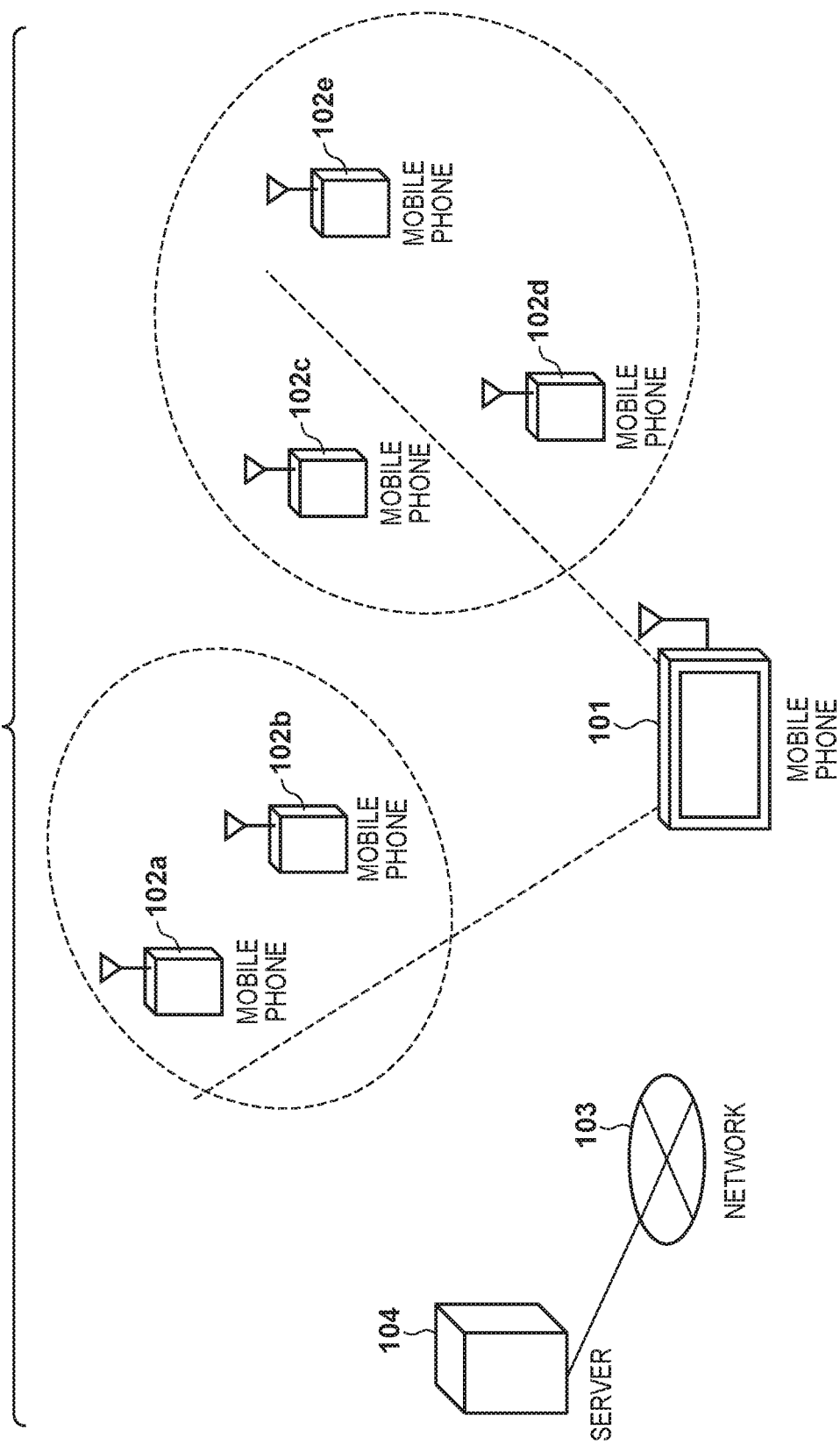
FIG. 1 shows an example configuration of a system.

FIG. 1 shows an example configuration of a system according to the present embodiment. In the present embodiment, a case is described where a mobile phone 101 having a digital camera function obtains information of the surroundings where shooting is performed.

The mobile phone 101 is an image display apparatus having functions of a digital camera and a function to display a shot image, and is also a communications apparatus having a function to perform communications by a wireless LAN (Local Area Network) complying with the series of IEEE 802.11 standards. Also, the mobile phone 101 has functions of identifying an object serving as a photographic subject from within a shot image based on characteristic information of the object, and displaying attribute information related to the object superimposed in the vicinity of the object within the shot image.

Other mobile phones 102a to 102e are communications apparatuses having a function to perform communications by a wireless LAN complying with the series of IEEE 802.11 standards. A mobile phone sends out identification information corresponding to that mobile phone, according to a cycle or in response to a request from another communications apparatus. The identification information can be an identifier for uniquely identifying an owner of a terminal, and information specifically set for each communications apparatus in the wireless LAN. Also, the identification information is provided as one element of Information Elements of a beacon frame in a wireless LAN complying with the series of IEEE 802.11 standards, and can be transmitted.

The mobile phone 101, for example, requests identification information from the other mobile phones 102a to 102e present in the surroundings of the mobile phone 101, and obtains identification information related to at least any of the other mobile phones 102a to 102e. Here, "surroundings", for example, means a predetermined range where the mobile phone 101 is capable of direct wireless communications, or in a case where the mobile phone 101 is connected to a single access point (AP) not shown in the drawings, can be a predetermined range where wireless communications with that AP are possible. Also, "surroundings" can be a predetermined range that includes a range where shooting was performed as a shot image. The mobile phone 101, using the obtained identification information, through a network 103, inquires to a server 104 for attribute information of the owners of the other mobile phones 102a to 102e corresponding to that identification information, and characteristic information of the owners. The server 104, in response to the inquiry from the mobile phone 101, from among the data stored in the server 104, transmits attribute information and characteristic information of the owner of the mobile phone corresponding to the identification information for the inquiry to the mobile phone 101 through the network 103.

Afterward, the mobile phone 101 uses the characteristic information obtained from the server 104 to identify objects included in the shot image. Then, the mobile phone 101, in a case where the identified object is present, in the vicinity of that object within the shot image, displays superimposed attribute information corresponding to the characteristic information that was used to identify the object.

In the present embodiment, the mobile phone 101 obtains identification information by communicating with at least two other mobile phones that are present in the surroundings. When doing so, the mobile phone 101 performs direct wireless communications with each of the other mobile phones in this embodiment.

Mobile Phone Configuration

FIG. 2 shows an example functional configuration of the mobile phone 101 according to the present embodiment. The mobile phone 101, for example, as functions of the mobile phone 101, has a shutter button 201, a capturing sensor unit 202, a touch panel 203, a wireless LAN communications unit 204, a mobile network communications unit 205, a cycle information detection unit 206, a cycle selection unit 212, a cycle information transmission unit 213, and a storage unit 214. Also, the mobile phone 101 has a battery 215 and a battery remaining amount detection unit 216. Further, the mobile phone 101 has an identification information obtaining unit 207, a characteristic information obtaining unit 208, a subject identification unit 209, a supplemental information obtaining unit 210, and an image combination unit 211.

The shutter button 201 is a button for starting shooting, and by a user of the mobile phone 101 pressing the shutter button 201, shooting processing in the capturing sensor unit 202 is started. The shutter button 201 can be a hardware button. Also, the shutter button 201 may be a button that is realized by software, and displayed as an image in an identified area of the touch panel 203, with shooting processing in the capturing sensor unit 202 being started by the user of the mobile phone 101 touching that area. The capturing sensor unit 202 is configured including hardware such as a lens, a sensor such as a CMOS or CCD sensor, and an A/D converter, and a program or the like that controls those hardware units, and the capturing sensor unit 202 generates image data by shooting. The touch panel 203 displays image data that was shot, and an interface for accepting operating input of the user, and is configured including a display for accepting operating input from the user, a program that controls the display, and the like.

The wireless LAN communications unit 204 is configured including an antenna for performing at least any of transmitting and receiving of wireless signals to/from another wireless apparatus using a wireless LAN, circuits, and programs for controlling the antenna and circuits and for controlling communications using the antenna and circuits. The wireless LAN communications unit 204 includes a DOZE mode as an operating mode. In the DOZE mode, by switching off the antenna, some hardware blocks, or the like, it is possible to reduce the power consumption of the mobile phone 101 instead of becoming unable to perform data communications by a wireless LAN. The mobile network communications unit 205 is configured including hardware such as an antenna for allowing operation of a telephone communications function and a packet communications function as a mobile phone, and programs for controlling those functions.

The cycle information detection unit 206, by the mobile phone 101 controlling the wireless LAN communications unit 204, receives a beacon (a notification signal) transmitted by the other mobile phones 102a to 102e present in the surroundings, and detects cycle information of the beacon. The identification information obtaining unit 207, by controlling the wireless LAN communications unit 204, transmits a request for identification information to the other mobile phones 102a to 102e, and obtains identification information from at least any of the other mobile phones 102a to 102e. The characteristic information obtaining unit 208 controls at least any of the wireless LAN communications unit 204 and the mobile network communications unit 205, to make an inquiry to the server 104 for characteristic information that has been associated with the identification information that was obtained by the identification information obtaining unit 207. Note that the characteristic information can be characteristic information of the face of an owner of the other mobile phones 102a to 102e. Also note that the cycle information detection unit 206, the identification information obtaining unit 207, and the characteristic information obtaining unit 208 can be realized by a program, for example.

The subject identification unit 209, based on the characteristic information of the face that was obtained by the characteristic information obtaining unit 208, identifies the position of the subject within the image data that was obtained by capturing with the capturing sensor unit 202. The subject identification unit 209, for example, is configured including hardware and a program. The supplemental information obtaining unit 210 controls at least any of the wireless LAN communications unit 204 and the mobile network communications unit 205, to make an inquiry to the server 104 for supplemental information that has been associated with the identification information that was obtained by the identification information obtaining unit 207. The image combination unit 211 combines supplemental information of the subject that was obtained by the supplemental information obtaining unit 210, in the vicinity of the position of the subject within the captured image that was identified by the subject identification unit 209 or at an arbitrary position, and creates combined image data. Note that the supplemental information obtaining unit 210 and the image combination unit 211 can be realized with a program, for example.

The cycle selection unit 212, from cycle information of a plurality of beacons that was detected by the cycle information detection unit 206, selects a cycle in which the mobile phone 101 transmits a beacon. The cycle information transmission unit 213, by controlling the wireless LAN communications unit 204, transmits a beacon in the cycle that was selected by the cycle selection unit 212. Note that the cycle selection unit 212 and the cycle information transmission unit 213 can be realized with a program, for example.

The storage unit 214 is configured with a ROM, a RAM, or the like where programs and data for controlling the mobile phone 101 are stored. The battery 215 is a battery for supplying power of the mobile phone 101. The battery remaining amount detection unit 216 detects a remaining amount of the battery 215. The battery remaining amount detection unit 216, for example, is configured with hardware and a program. When the remaining amount of the battery 215 has decreased to a certain amount or less, the battery remaining amount detection unit 216 performs the processing described below.

Configuration of Other Mobile Phones

FIG. 3 shows an example functional configuration of the other mobile phones 102a to 102e. The other mobile phones 102a to 102e, for example, have a wireless LAN communications unit 301, a beacon transmission unit 302, and a mobile network communications unit 303. The wireless LAN communications unit 301 is configured including an antenna for performing at least any of transmitting and receiving of wireless signals to/from another wireless apparatus using a wireless LAN, circuits, and programs for controlling the antenna and circuits and for controlling communications using the antenna and circuits. The wireless LAN communications unit 301 includes a DOZE mode as described above as an operating mode. The mobile network communications unit 303 is configured including hardware such as an antenna for operation as a mobile phone, and programs for controlling such hardware.

The beacon transmission unit 302 controls the wireless LAN communications unit 301 to cause transmission of a beacon according to a cycle. The beacon transmission unit 302 is configured with a program, for example. Information elements of a Beacon Interval and a TSF (Time Synchronization Function) in the series of IEEE 802.11 standards are provided in the beacon, in order to give notification of the cycle in which the beacon is transmitted.

Data Held by Server

FIG. 4 is a concept diagram of data held by the server 104. Identification information is registered as an identifier for uniquely identifying the owner of a mobile phone, and further, comments are registered as supplemental information related to each owner. Also, in the data held by the server 104, characteristic information is registered that enables identification of the face of each owner from image data. Typically, in a database, names or comments are stored as text data, and characteristic information is stored as binary data such as photograph data. In the present embodiment, in the data held by the server 104, identification information of each owner of a mobile phone 102 is stored, and comments and characteristic information are stored as supplemental information. Note that in this embodiment, corresponding data for the mobile phone 102e is not registered in the server 104.

Flow of Processing

Figure 6:
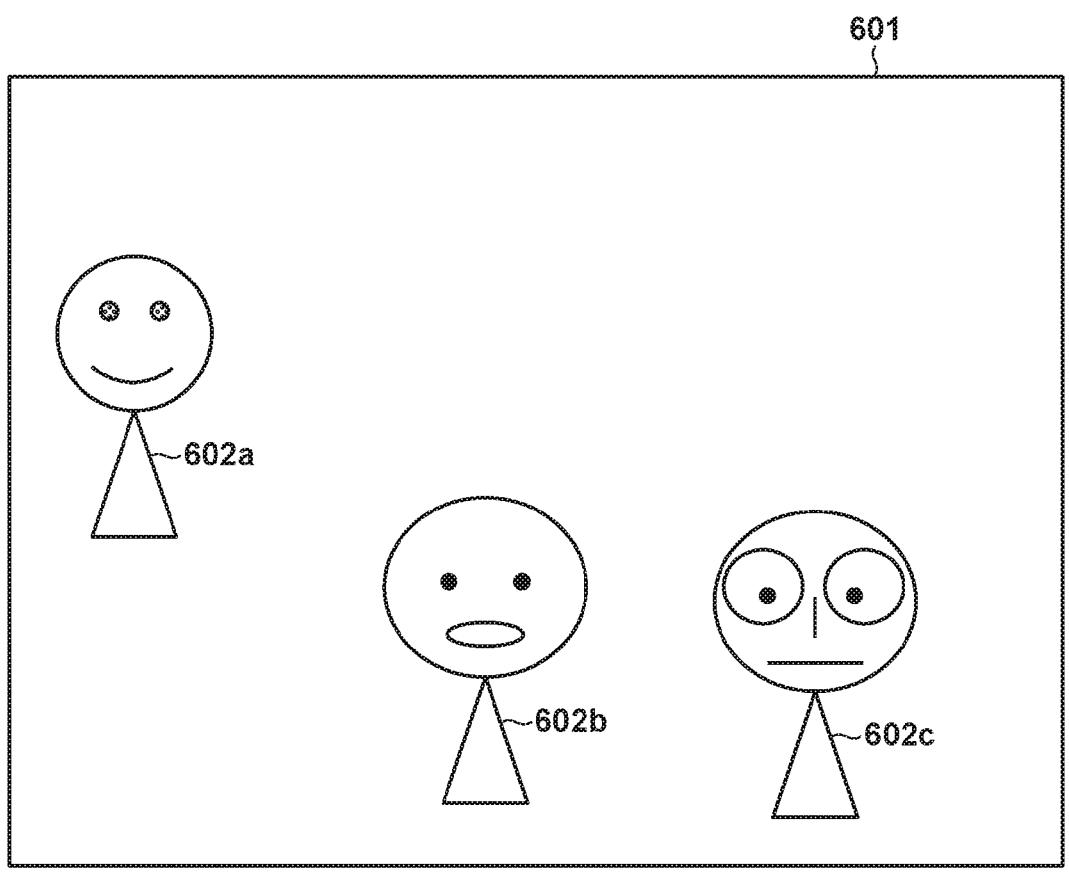
FIG. 6 shows an example of image data that has been shot.

Next is a description of the flow of processing executed in the system according to the present embodiment. FIG. 5 is a sequence diagram that shows an example flow of processing. First, the mobile phone 101 starts shooting due to the shutter button 201 being pressed by the user, and generates image data using the capturing sensor unit 202 (step S501). Note that the mobile phone 101 does not necessarily have to perform image capturing in this processing, and for example, may obtain a previously shot image or an image shot by another apparatus. FIG. 6 shows an example of image data that can be generated by the capturing sensor unit 202. Image data 601 is an image that was generated by the capturing sensor unit 202. Within the image data 601, subject images 602a to 602c are displayed, and the subject images 602a to 602c respectively correspond to owners of the other mobile phones 102a to 102c. Note that the owner of the mobile phone 102d is present outside of the range that was shot, and therefore is not included within the image data 601.

Figure 7:
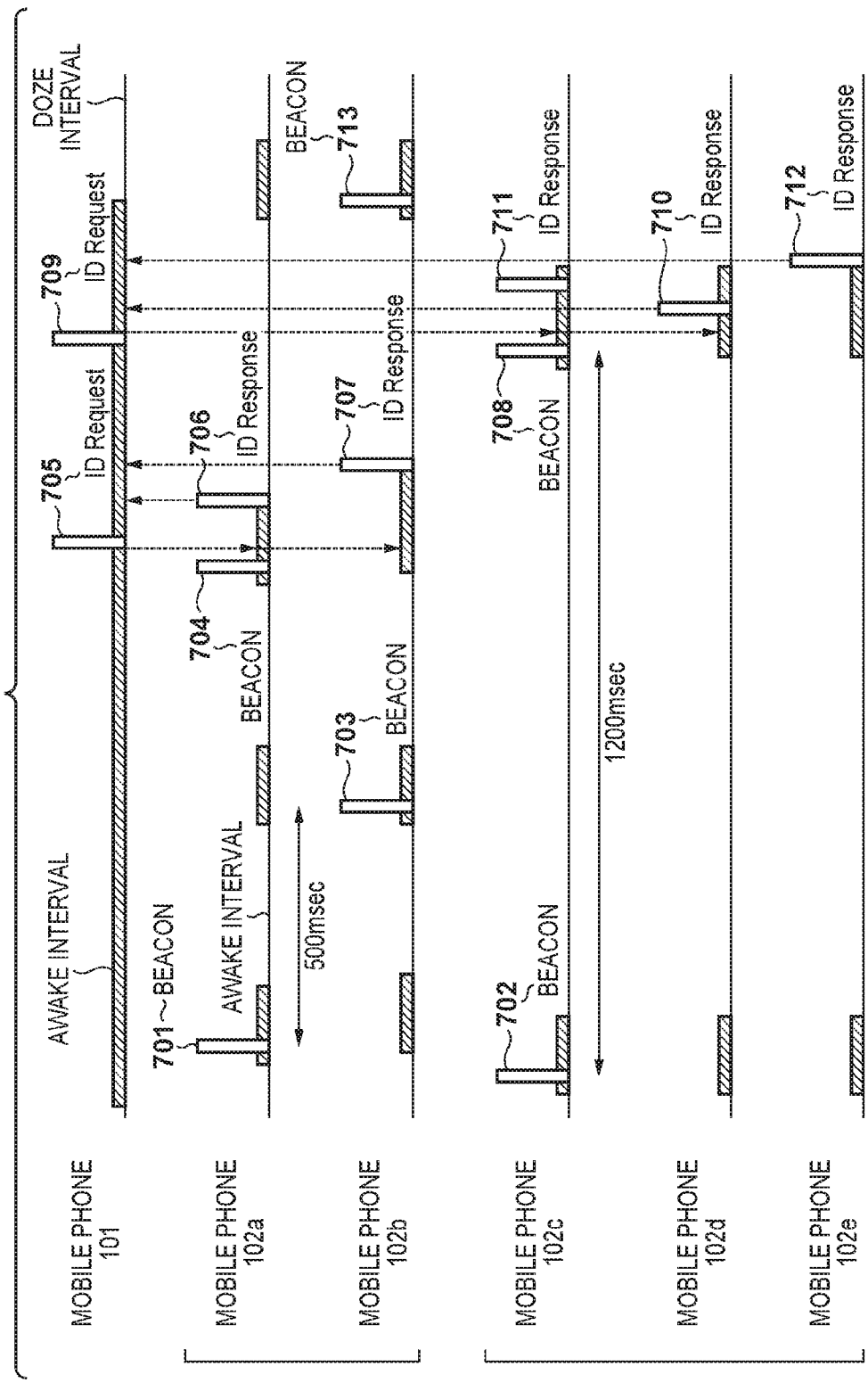
FIG. 7 is a sequence diagram that shows an example flow of identification information detection processing by a mobile phone.

When generating the image data 601, next, the mobile phone 101 obtains identification information from other mobile phones in the surroundings (step S502). Here, processing to obtain identification information is described with reference to FIG. 7. FIG. 7 is a sequence diagram that shows an example of processing when the mobile phone 101 obtains identification information from the mobile phones 102.

The other mobile phones 102a to 102d each transmit a beacon according to a cycle. In the example in FIG. 7, the cycles in which a beacon is transmitted are synchronized between the other mobile phones 102a and 102b, and that beacon cycle is 500 msec. Also, the cycles in which a beacon is transmitted are synchronized between the other mobile phones 102c and 102d, and that beacon cycle is 1200 msec.

Among the plurality of other mobile phones with beacons synchronized, preferably at least any one of those mobile phones transmits a beacon within each cycle. That is, in a case where the mobile phone 102a is transmitting a beacon 701, in that cycle the mobile phone 102b does not have to transmit a beacon. Also, in a case where the mobile phone 102b is transmitting a beacon 703, in that cycle the mobile phone 102a does not have to transmit a beacon. Similarly, at least any one of the mobile phone 102c and the mobile phone 102d transmits a beacon within each beacon cycle.

Which of the mobile phones 102a to 102e transmits a beacon in each beacon cycle may be determined in any manner. For example, as in back-off control of beacon transmission by IBSS, a configuration is preferably adopted in which a mobile phone whose random wait time first became zero transmits a beacon, and another mobile phone that detected that beacon does not transmit a beacon in that cycle. Also, a configuration may be adopted in which one identified mobile phone certainly transmits a beacon, and another mobile phone does not transmit a beacon. In any case, at least one mobile phone transmits a beacon in each beacon cycle.

When not in the beacon cycle, the mobile phones 102a to 102e enter a DOZE mode in which the wireless LAN communications unit 301 does not transmit/receive data, and when in the beacon cycle, the mobile phones 102a to 102e enter an AWAKE mode in which the wireless LAN communications unit 301 transmits data for a certain amount of time. The mobile phones 102a to 102e inform the other mobile phones of the time period that they are in this AWAKE mode by providing the Information Elements described in FIG. 8 in the beacon. The Information Elements are defined as Vendor Specific Elements, and have Information Elements of a Device ID and a Listen Period. Identification information of each mobile phone, for example similar information as the identification information that is registered in the server 104 shown in FIG. 4, can be stored in the Device ID. Information indicating the time period that each mobile phone is in the AWAKE mode in which data transmitting and receiving can be executed during the beacon cycle can be stored in the Listen Period. By reading this Listen Period, other mobile phones can know the amount of time after reception of the beacon including that Listen Period for which it is possible to transmit data such that the data can be received by the mobile phone that transmitted the beacon. Also, all of the other mobile phones operating in the same beacon cycle operate in the AWAKE mode only during the same Listen Period, so in that period data can be received.

Next is a description of processing when the mobile phone 101 obtains identification information from the other mobile phones 102 present in the surroundings. The mobile phone 101 continues to receive data for a certain period of time in the AWAKE mode with the cycle information detection unit 206. Also, the mobile phone 101 receives beacons 701, 702, and 703 that are respectively transmitted by the other mobile phones 102a, 102b, and 102c. When these beacons are received, the mobile phone 101, with the cycle information detection unit 206, reads the TSF (Time Synchronization Function), Beacon Interval, and Listen Period included in the beacons. Then, the mobile phone 101, with the cycle information detection unit 206, detects the period in which the other mobile phones 102a to 102e present in the surroundings are in the AWAKE mode and can be receive data. When detecting timing, the mobile phone 101 transmits a message for requesting identification information to the other mobile phones 102a to 102e that transmitted a beacon, while the other mobile phones 102a to 102e are operating in the AWAKE mode. Specifically, the mobile phone 101, with the identification information obtaining unit 207, transmits an ID Request 705 and an ID Request 709 in a broadcast for each detected timing.

FIG. 9 shows an example configuration of an ID Request frame. The ID Request frame is an extension of a Public Action Frame prescribed in the IEEE 802.11 standards. The Action field includes information indicating that this is an Action Frame for detecting identification information. The Device ID includes identification information of the communications apparatus that was the transmission source. That is, here, the identification information of the mobile phone 101 is included in the Device ID. The Type field includes information indicating that identification information has been requested.

Here, in the example in FIG. 7, the beacons 701 and 703 are transmitted in the same beacon cycle, so the mobile phone 101 transmits only the single ID Request 705 to the other mobile phones 102a and 102b. Thus, the mobile phone 101 can request identification information from a plurality of synchronized mobile phones with a single ID Request to a group including that plurality of mobile phones. Also, in a case where only the beacon 702 has been detected, the mobile phone 101, with a single ID request, can request identification information also from the mobile phones 102d and 102e that are operating in the same beacon cycle as the beacon 702. Note that in this case, the mobile phone 101 requests identification information also from the mobile phone 102c, which was the transmission source of the beacon 702.

The mobile phones 102a and 102b are both in the AWAKE mode when the mobile phone 101 transmits the ID Request 705, and therefore can receive that ID Request 705. When the ID Request 705 is received, the mobile phones 102a and 102b determine that identification information has been requested, and respectively transmit ID Responses 706 and 707 including their own identification information. The mobile phones 102c to 102e are all in the AWAKE mode when the mobile phone 101 transmits the ID Request 709, and therefore can receive that ID Request 709. Note that the mobile phone 101 has not received a beacon from the other mobile phones 102d and 102e, but the other mobile phones 102d and 102e are switched between the AWAKE mode and the DOZE mode in the same beacon cycle as the mobile phone 102c. Therefore, by the mobile phone 101 transmitting the ID Request 709 at a timing based on the cycle of the beacon in notification from the mobile phone 102c, the mobile phones 102d and 102e can receive that ID Request 709.

Note that depending on the application, there can be cases where identification information is not required a certain number of times or more. Therefore, a configuration may be adopted in which the mobile phone 101 does not transmit an ID Request when identification information has been received a certain number of times or more prior to transmitting the ID Request. Also, in the above-described embodiment, the mobile phone 101 transmits a collective ID Request after detecting a plurality of beacons in the surroundings, but a configuration may also be adopted in which an individual ID Request is transmitted each time a beacon is detected.

Figure 10:
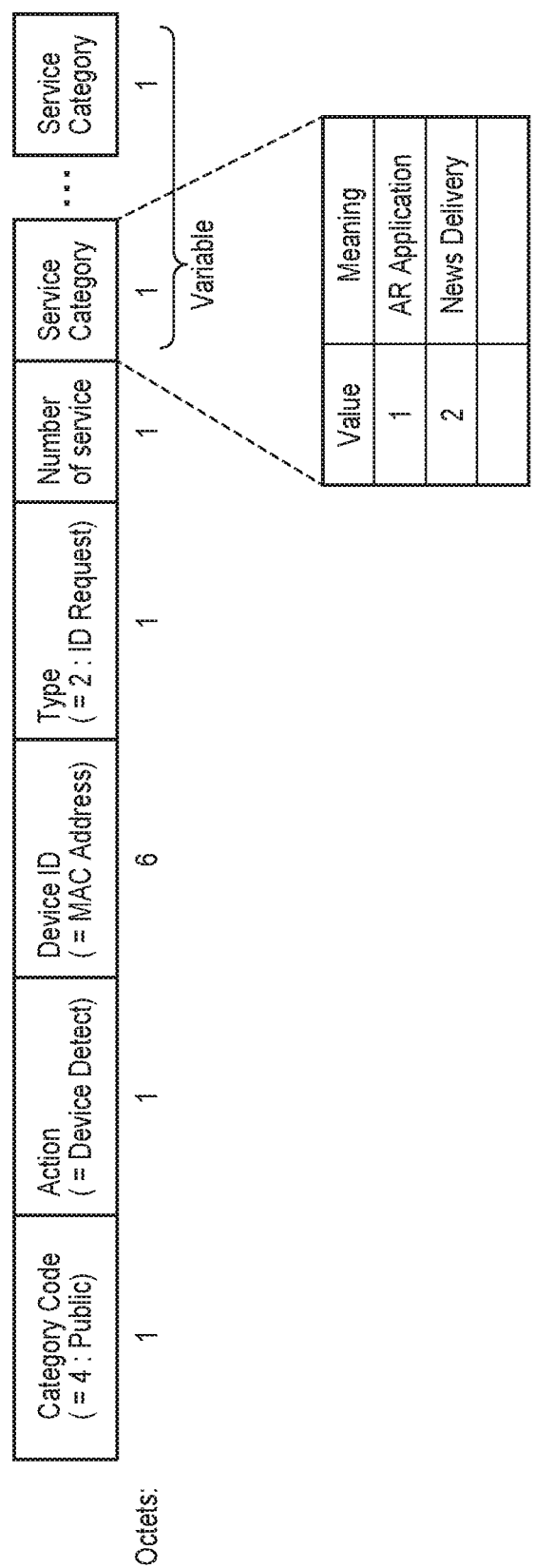
FIG. 10 shows a summary of an ID Response frame.

FIG. 10 shows an example configuration of an ID Response frame. The ID Response frame is an extension of a Public Action Frame, like the ID Request frame. The Action field and the Device ID are the same as in the ID Request. The Type field includes information indicating that this is an ID Response indicating a response to an ID Request. The Number of service field includes information of a compatible Service Category number of the communications apparatus that was the transmission source of the ID Response. Information of a compatible service of the communications apparatus that was the transmission source of the ID Response is stored in the Service Category. This service, for example, can include a service for which information of the communications apparatus that was the transmission source of the ID Response is registered in the server 104, with another communications apparatus being able to obtain this information and display a comment within a captured image. When compatible with this sort of service, information is stored in the Service Category that indicates compatibility with an AR Application service. Note that here, a description for the case of an AR application is given, but all or part of the processing described here can be similarly handled also in a case where another predetermined service is used instead of an AR Application service. Accordingly, the Service Category can include information related to various services other than an AR Application service.

Information for the mobile phones 102a to 102d is registered in the server 104, and the mobile phones 102a to 102d are compatible with an AR Application. Therefore, information indicating an AR Application is included in the Service Category of the ID Responses 706 and 707, and ID Responses 710 and 711. On the other hand, information for the mobile phone 102e has not been registered in the server 104, and the mobile phone 102e is not compatible with an AR Application, so information indicating an AR Application is not included in the Service Category of an ID Response 712.

The mobile phone 101 is able to detect identification information of each mobile phone 102 from the Device IDs respectively included in the received ID Responses 706 and 707, and ID Responses 710 to 712.

Returning to FIG. 5, the mobile phone 101 extracts identification information corresponding to an AR Application from among the ID Responses obtained in step S502 (step S503). Here, the identification information of the mobile phones 102a to 102d is extracted, and the identification information of the mobile phone 102e that is not compatible with an AR Application is not extracted. When extracting the identification information, the mobile phone 101, based on the extracted identification information, inquires to the server 104 through the characteristic information obtaining unit 208 for the characteristic information of the owners of the mobile phones 102a to 102d (step S504). When the server 104 receives the request for characteristic information, the server 104 extracts the characteristic information associated with the requested identification information from the stored data in FIG. 4, and transmits the extracted characteristic information to the mobile phone 101 as a response (step S505).

When the mobile phone 101 receives the response in step S505, the mobile phone 101, with the subject identification unit 209, identifies a subject from the image data obtained in step S501, that is, identifies the owners of the mobile phones 102a to 102d (step S506). Here, owners of the mobile phones 102a to 102c are present in the image data 601, so these owners can be detected, but an owner of the mobile phone 102d is not present in the image data 601, so that owner cannot be identified. When identifying subjects, the mobile phone 101, through the supplemental information obtaining unit 210, inquires to the server 104 for supplemental information corresponding to identification information of subjects that were identified (step S507). Here, identification information of subjects that were identified is the identification information of the mobile phones 102a to 102c. As in step S505, the server 104 extracts the supplemental information corresponding to the received identification information from the stored data, and returns the extracted supplemental information to the mobile phone 101 as a response (step S508).

Figure 11:
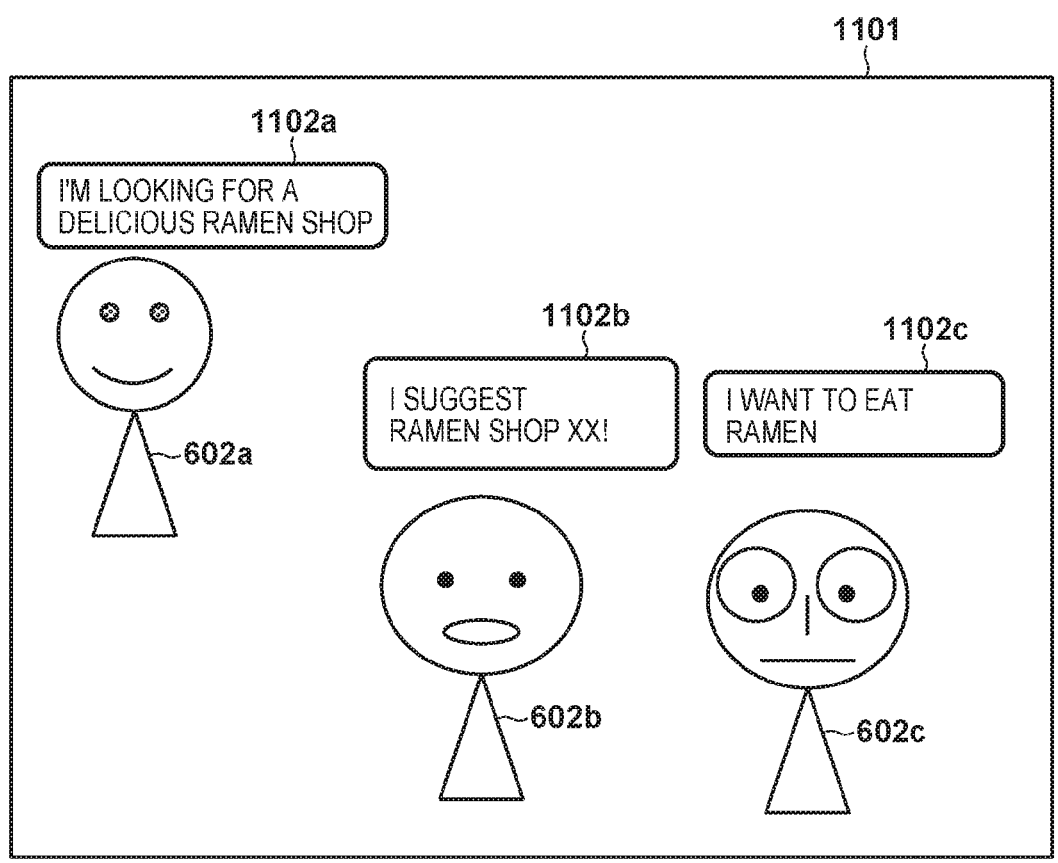
FIG. 11 shows an example of combined image data that has been combined.

When the response of supplemental information is received from the server 104, the mobile phone 101, with the image combination unit 211, combines supplemental information corresponding to an identified subject in the vicinity of the subject (step S509). FIG. 11 shows an example of combined image data 1101. In the image data 1101, supplemental information 1102 corresponding to each subject is combined in the vicinity of each subject image 602 within the shot image data 601. The mobile phone 101 displays the combined image data 1101 in the touch panel 203. Thus, the user of the mobile phone 101 can know at a glance which supplemental information belongs to which subject.

The mobile phone 101, after displaying the combined data (step S510), enters a mode in which a beacon is transmitted according to a cycle, such that other mobile phones can detect the mobile phone 101 in the same manner as the mobile phones 102. Therefore, the mobile phone 101, with the cycle selection unit 212, selects the timing at which the mobile phone 101 transmits a beacon from among the beacon cycles detected in step S502 (step S511).

Here, for example, among cycles corresponding to received beacons, a cycle with a greater number of beacons that include identification information corresponding to a subject that was identified in step S506 is selected. In the present embodiment, subjects of the mobile phones 102a to 102c were identified in step S506, so the beacon cycle of the mobile phones 102a and 102b is selected. The mobile phone 101 obtained three items of identification information for the mobile phones 102c to 102e in the same beacon cycle as the mobile phone 102c. However, the mobile phone 102e is not compatible with an AR Application, and the owner of the mobile phone 102d is not included in the image data. Therefore, regarding the beacon cycle of the mobile phone 102c, only one beacon transmitted by the mobile phone 102c includes identification information corresponding to a subject that was identified in step S506. Accordingly, the mobile phone 101 selects the beacon cycle of the mobile phones 102a and 102b, where two beacons are present that include identification information corresponding to a subject that was identified in step S506.

When the mobile phone 101 selects a beacon cycle, a beacon (notification signal) that includes the identification information is transmitted according to that beacon cycle (step S512). Thus, the mobile phone 101 can enable detection of the mobile phone 101 by other mobile phones.

Figure 12:
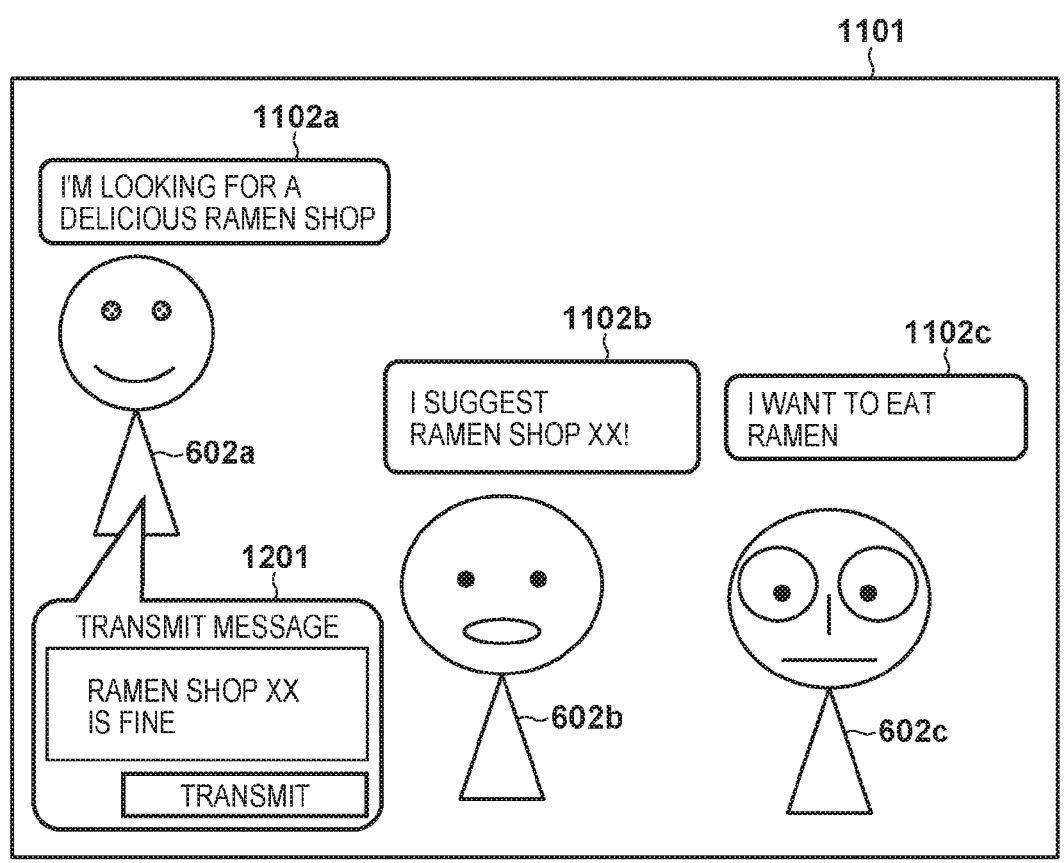
FIG. 12 shows an example message transmission screen.

Next is a description of processing in which the owner of the mobile phone 101 transmits a message to the mobile phone 102 of a subject present within the image data 1101. When the owner of the mobile phone 101 clicks on a subject image 602*a* that is an image of the owner of the mobile phone 102, displayed on the touch panel 203, a message transmission screen is displayed within the image data 1101. FIG. 12 shows an example screen displayed at that time. In this screen, a balloon-like message transmission screen 1201 is displayed for the subject image 602*a*, and the owner of the mobile phone 101 can input a message here that the owner would like to transmit, and transmit the message.

Figure 13:
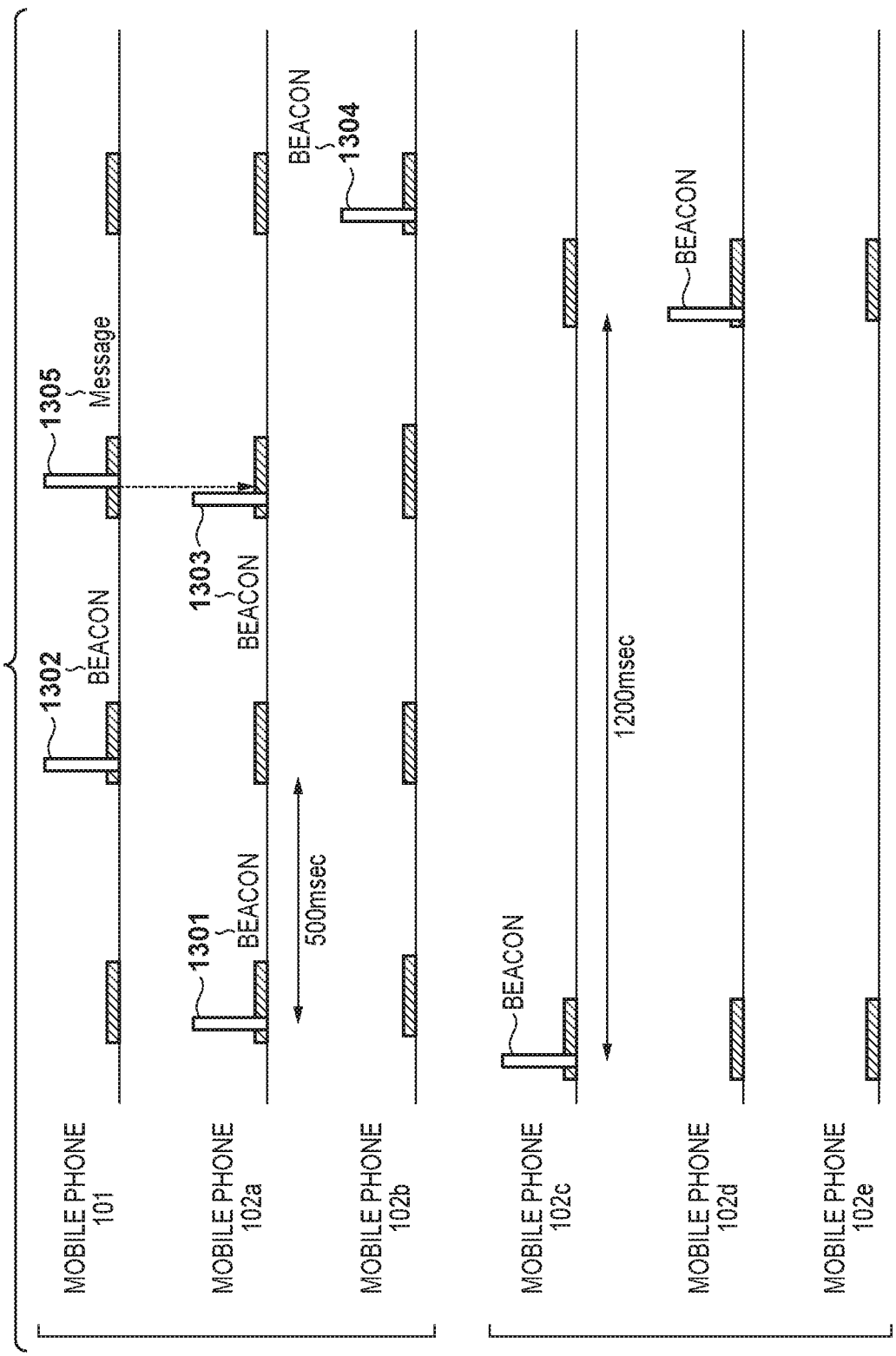
FIG. 13 is a sequence diagram that shows an example flow of processing when transmitting a Message.

FIG. 13 shows an example flow of a message transmitted from the mobile phone 101 to the mobile phone 102*a*. The mobile phone 101 has the same beacon cycle as the mobile phones 102*a* and 102*b*. Therefore, the mobile phone 101 and the other mobile phones 102*a* and 102*b* operate in the AWAKE mode simultaneously, with the timing of beacons 1301 to 1304. When the owner instructs transmission of the message, the mobile phone 101 transmits a Message 1305 including message information, at a timing such that the mobile phone 102*a* is operating in the AWAKE mode. Thus, the mobile phone 102*a* can receive the Message 1305.

FIG. 14 shows an example frame of the Message 1305. The Message is an extension of a Public Action Frame prescribed in the IEEE 802.11 standards. The Action field includes information indicating that this is an Action Frame for detecting identification information. The Device ID includes identification information of the communications apparatus that was the transmission source. That is, here, the identification information of the mobile phone 101 is included in the Device ID. The Type field includes information indicating that a message has been transmitted. The Data field includes the content of the message that was input by the owner of the mobile phone 101 in FIG. 13.

Note that in a case where it is desired to transmit a large quantity of data such as an image rather than text such as a message in FIG. 13, a configuration may be adopted in which the mobile phone 101 constructs a Wi-Fi Direct or Infra BSS network, and performs data exchange.

In the processing in FIG. 5, the mobile phone 101 is synchronized to a beacon cycle in which many beacons are transmitted that have the same Service Category and include identification information corresponding to a subject. Therefore, in a case where it is necessary to perform data communications in this way, to the extent that it is not necessary to again detect those beacons, it is possible to increase the probability of having little communications delay. Note that in the above description, the mobile phone 101 is synchronized to a beacon cycle in which many beacons are transmitted that include identification information corresponding to a subject, but a configuration may also be adopted in which the mobile phone 101 is simply synchronized to a beacon cycle in which there are many other mobile phones that are synchronized. In this case, even when the mobile phone 101 transmits a signal that includes information that is not information related to a captured image such as the above-described sort of message, it is possible to increase the probability of having little communications delay.

Note that when the mobile phone 101 is synchronized to a beacon cycle having a short interval, battery consumption can be greater than when the mobile phone 101 is synchronized to a beacon cycle having a long interval. Therefore, for example in a case where there is not much battery amount remaining, the mobile phone 101 may switch the synchronized beacon cycle. This sort of processing is described with reference to FIG. 15.

When the battery remaining amount detection unit 216 detects that the battery remaining amount has become a certain amount or less, the mobile phone 101, with the cycle information detection unit 206, again detects the beacon cycle of other mobile phones in the surroundings. Here, it is assumed that the mobile phone 101 detected beacons 1501 to 1503. Note that the beacons 1502 and 1503 follow the same beacon cycle.

When detecting beacon cycles, the mobile phone 101 selects the beacon cycle having the longest beacon cycle among the beacon cycles that were detected. In the example in FIG. 15, the longest beacon cycle is the beacon cycle followed by the beacon 1501. Therefore, the mobile phone 101 selects the beacon cycle followed by the beacon 1501 as the beacon cycle to which the mobile phone 101 will be synchronized. Note that a configuration may also be adopted in which the mobile phone 101 selects one beacon cycle from among beacon cycles of at least a predetermined length, rather than following the longest beacon cycle. For example, a configuration may also be adopted in which, regarding each beacon cycle of at least a predetermined length, the mobile phone 101 selects one beacon cycle according to the number of other mobile phones that are transmitting beacons according to that beacon cycle.

Afterward, the mobile phone 101 transmits a beacon 1504 according to the beacon cycle followed by the beacon 1501. In a case where it is desired to suppress battery consumption, such as when there is little battery amount remaining, the mobile phone 101 can suppress a reduction in the amount of battery remaining by lengthening the period of the DOZE mode with the processing in FIG. 15.

Note that a configuration may also be adopted in which the mobile phone 101, instead of again detecting cycle information, saves in advance in the storage unit 214 all of the information of beacon cycles that were detected in step S502, and selects the beacon cycle having the longest beacon interval from the saved beacon cycles. A configuration may also be adopted in which another mobile phone 102 also, like the mobile phone 101, detects cycle information of the surroundings when there is a decrease in the amount of battery remaining or according to a cycle, and changes the beacon cycle of the mobile phone 102.

Note that a configuration may be adopted in which, even after once selecting cycle information, the mobile phone 101 detects cycle information according to a cycle, and re-selects a beacon cycle in which many beacons were detected that include identification information related to other mobile phones compatible with AR, for example. Also, the mobile phone 101 may re-select a beacon cycle in which many beacons were detected, regardless of compatibility with AR, for example. Note that here, the standard for "many", for example, can be at least a predetermined number or the greatest number. Also, in a case where at least a predetermined number of beacons was detected in a plurality of beacon cycles, the mobile phone 101 may select the longest beacon cycle among those beacon cycles, for example. Thus, the mobile phone 101 can suppress battery consumption while being synchronized with a large number of other mobile phones.

According to the present invention, it is possible to improve frequency utilization efficiency when communicating with a plurality of other communications apparatuses that each become capable of data communications in independent cycles.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-055352, filed Mar. 18, 2015 which is hereby incorporated by reference herein in its entirety.

What is claimed is:

1. A communications apparatus, comprising:
one or more processors; and
a memory having stored thereon instructions, which when executed by the one or more processors, causes the communications apparatus to:
determine a timing of starting a period when a communications group, to which a plurality of other communications apparatuses belong, can perform communications, based on a beacon signal that was received by the communications apparatus in a predetermined period;
transmit a signal that requests obtaining of information to the plurality of other communications apparatuses, according to the determined timing; and
obtain information from each of the plurality of other communications apparatuses in a case where the signal was transmitted,
wherein in a case where a first communications group and a second communications group having different timings of starting a period when communications are possible were detected based on a plurality of beacon signals that were received by the communications apparatus in the predetermined period, the signal is transmitted to a plurality of other communications apparatuses that belong to the first communications group, according to the timing that was determined based on a beacon from an apparatus that belongs to the first communications group from among the plurality of beacon signals, and the signal is transmitted to a plurality of other communications apparatuses that belong to the second communications group, according to the determined timing based on a beacon from an apparatus that belongs to the second communications group from among the plurality of beacon signals.

2. The communications apparatus according to claim 1, wherein the instructions, when executed by the one or more processors, further cause the communications apparatus to transmit the signal one time for each group.

3. The communications apparatus according to claim 1, wherein the first communications group and the second communications group each include a plurality of other communications apparatuses having periods when communications are possible that are synchronized with each other.

4. The communications apparatus according to claim 1, wherein the instructions, when executed by the one or more processors, further cause the communications apparatus to use image capturing as a trigger for transmitting the signal.

5. The communications apparatus according to claim 1, wherein an apparatus that belongs respectively to the first communications group and the second communications group enters a DOZE state in which transmitting and receiving is not performed, in a period other than a period when communications are possible.

6. The communications apparatus according to claim 1, wherein the instructions, when executed by the one or more processors, further cause the communications apparatus to determine the timing of starting the period when communications are possible of a communications group based on an Information Element included in a beacon signal that was received by the communications apparatus.

7. The communications apparatus according to claim 6, wherein the Information Element includes information that indicates a period when communications are possible.

8. The communications apparatus according to claim 1, wherein the instructions, when executed by the one or more processors, further cause the communications apparatus to transmit a beacon including information that indicates a period when communications are possible of a communications group, according to the determined timing.

9. The communications apparatus according to claim 1, wherein the instructions, when executed by the one or more processors, further cause the communications apparatus to obtain service information or identification information.

10. The communications apparatus according to claim 1, wherein the instructions, when executed by the one or more processors, further cause the communications apparatus to, in a case where the first communications group and the second communications group were detected based on the plurality of beacon signals that were received by the communications apparatus in the predetermined period, select one among the first communications group and the second communications group, and
wherein the communications apparatus transmits a beacon in a period when communications are possible for the selected group.

11. The communications apparatus according to claim 10, wherein the instructions, when executed by the one or more processors, further cause the communications apparatus to select one among the first communications group and the second communications group, according to a number of the plurality of other communications apparatuses that belong respectively to the first communications group and the second communications group.

12. The communications apparatus according to claim 10, wherein the instructions, when executed by the one or more processors, further cause the communications apparatus to select one among the first communications group and the second communications group, according to a number of the plurality of other communications apparatuses that are compatible with a predetermined service and belong respectively to the first communications group and the second communications group.

13. The communications apparatus according to claim 10, wherein the instructions, when executed by the one or more processors, further cause the communications apparatus to select one among the first communications group and the second communications group, according to a length of a cycle of starting a period when communications are possible respectively for the first communications group and the second communications group.

14. The communications apparatus according to claim 10, wherein the instructions, when executed by the one or more processors, further cause the communications apparatus to select one among the first communications group and the second communications group, according to a remaining amount of a battery of the communications apparatus or according to a cycle.

15. A method for controlling a communications apparatus, comprising:
   determining a timing of starting a period when a communications group, to which a plurality of other communications apparatuses belong, can perform communications, based on a beacon signal that was received by the communications apparatus in a predetermined period;
   transmitting a signal that requests obtaining of information to the plurality of other communications apparatuses, according to the timing that was determined; and
   obtaining information from each of the plurality of other communications apparatuses in a case where the signal was transmitted,
   wherein in the transmitting, in a case where a first communications group and a second communications group having different timings of starting a period when communications are possible were detected based on a plurality of beacon signals that were received by the communications apparatus in the predetermined period, to a plurality of other communications apparatuses that belong to the first communications group, the signal is transmitted according to the timing that was determined based on a beacon from an apparatus that belongs to the first communications group from among the plurality of beacon signals, and to a plurality of other communications apparatuses that belong to the second communications group, the signal is transmitted according to the timing that was determined based on a beacon from an apparatus that belongs to the second communications group from among the plurality of beacon signals.

16. A non-transitory computer-readable storage medium storing a computer program causing a computer provided in a communications apparatus to perform operations of:
   determining a timing of starting a period when a communications group, to which a plurality of other communications apparatuses belong, can perform communications, based on a beacon signal that was received by the communications apparatus in a predetermined period;
   transmitting a signal that requests obtaining of information to the plurality of other communications apparatuses, according to the timing that was determined; and
   obtaining information from each of the plurality of other communications apparatuses in a case where the signal was transmitted,
   wherein in the transmitting, in a case where a first communications group and a second communications group having different timings of starting a period when communications are possible were detected based on a plurality of beacon signals that were received by the communications apparatus in the predetermined period, to a plurality of other communications apparatuses that belong to the first communications group, the signal is transmitted according to the timing that was determined based on a beacon from an apparatus that belongs to the first communications group from among the plurality of beacon signals, and to a plurality of other communications apparatuses that belong to the second communications group, the signal is transmitted according to the timing that was determined based on a beacon from an apparatus that belongs to the second communications group from among the plurality of beacon signals.

* * * * *